Patented May 24, 1949

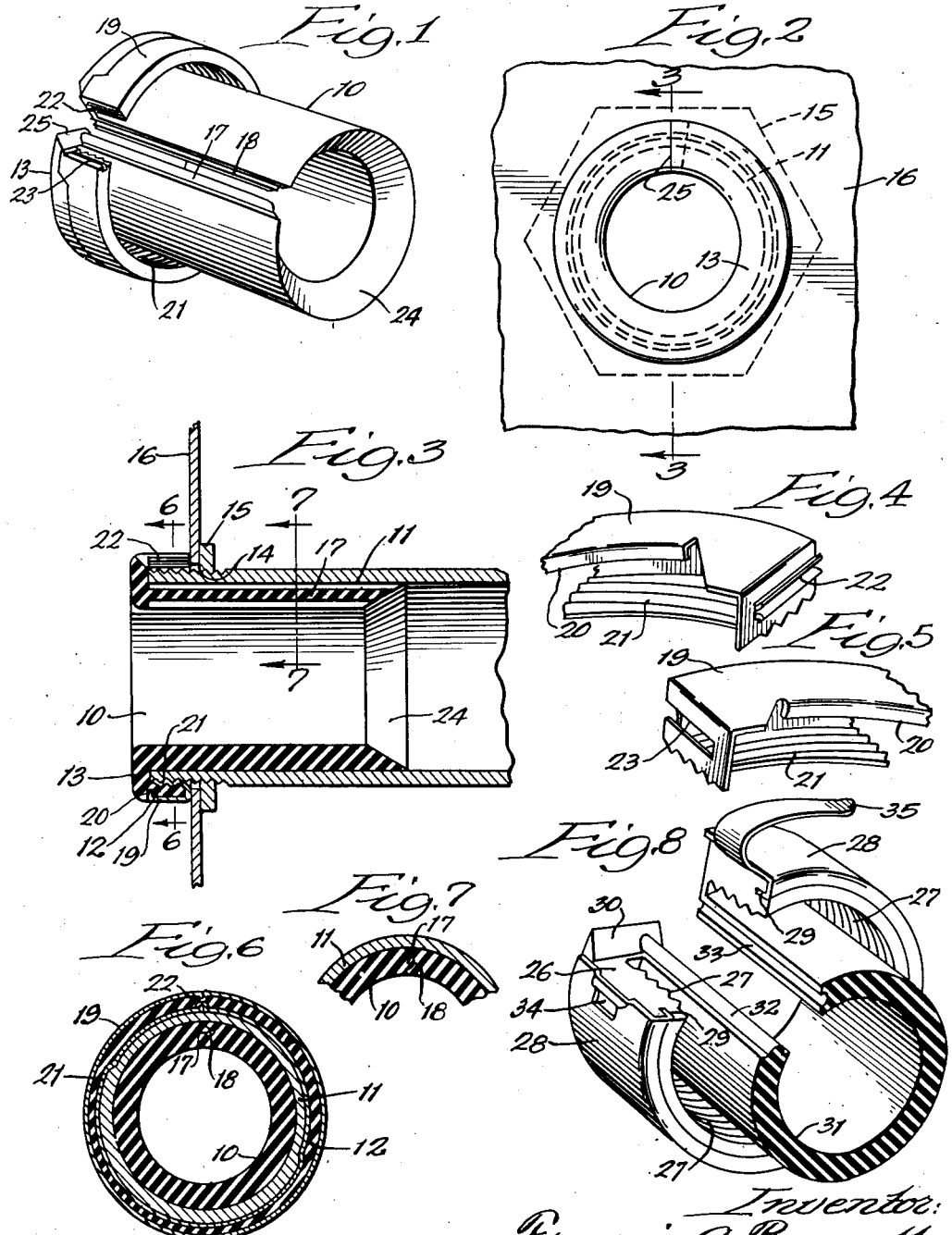

2,470,886

UNITED STATES PATENT OFFICE 2,470,886

INSULATING BUSHING

Francis A. Buzzell, Chicago, Ill.

Application February 7, 1948, Serial No. 7,002

11 Claims. (Cl. 174—82)

This invention relates to an insulating bushing for electrical conduits, and the like, and more particularly to a bushing designed to protect and insulate wires for electrical connections which extend from the ends of conduits.

An object of the invention is to provide a method and means of insulating conductors already within a conduit with a resilient bushing. A still further object is to provide an insulating bushing adapted to be readily placed about conductors extending within a conduit to provide an enclosure about the conductors that extend from the end of the conduit and to protect and insulate the same. Other specific objects and advantages will appear as the specification proceeds.

The invention is illustrated, in preferred embodiments, by the accompanying drawing, in which—

Figure 1 is a perspective view of a bushing embodying my invention; Fig. 2, a front view in elevation of the bushing applied to a conduit; Fig. 3, a longitudinal sectional view, the section being taken as indicated at line 3 of Fig. 2; Fig. 4, a perspective view of the metal lining member removed from the resilient bushing body, the lining member being equipped with a tongue; Fig. 5, a view similar to Fig. 4 but showing the opposite end of the metal member, which is equipped with a slot or groove adapted to receive the tongue of the structure shown in Fig. 4; Fig. 6, a transverse sectional view, the section being taken as indicated at line 6 of Fig. 3; Fig. 7, a transverse sectional view, the section being taken as indicated at line 7 of Fig. 3; and Fig. 8, a perspective view of a modified form of bushing embodying my invention.

In the illustration given in Figs. 1 to 7, inclusive, the bushing is provided with a tubular body portion 10 adapted to be received within the conduit 11 and with an outer ring portion 12 integral with the body 10 and spaced therefrom, as shown more clearly in Fig. 3. It will be noted that the body 10 is provided at its outer end with an outwardly-extending flange 13 merging with the annular flange or ring 12, which extends rearwardly of the flange 13. The rearwardly-extending flange or ring 12 is parallel with the body 10.

The conduit 11 is provided with the usual threaded forward portion 14 and with a threaded nut or washer 15. The nut or washer 15 bears against the wall indicated by the numeral 16.

The new bushing is characterized by being divided throughout, as shown more clearly in Fig. 1. One longitudinal edge of the tubular body 10 is provided with a tongue 17, while the other edge is provided with a groove 18. Thus, when the side walls of the body 10 are pressed together, the tongue and groove form a seal, as indicated more clearly in Fig. 7.

The annular flange or ring 12 is shown equipped with a metal ring 19. The ring 19 has a flange 20 embedded in the body of the bushing, and on its inner side, the metal strip is provided with threads 21 adapted to mesh with the threads 14 of the conduit 11. At one end, the metal ring 19 has metal thrust therefrom and spread outwardly to form a tongue 22, as shown in detail in Fig. 4. The opposite end of the metal ring 19 has a portion of the metal cut away to provide a groove 23.

The integral structure 10, 12 and 13 may be formed of any suitable resilient or flexible plastic, rubber, artificial rubber, etc. If desired, the metal ring 19 may be omitted, and a plastic material capable of providing effective threads for engagement with the threads 14 of conduit 11 may be employed. Resilient plastic material, synthetic or natural resins, and newly developed products, such as "Koroseal," or plasticized vinyl chloride may be used. Rubber and synthetic rubber products are satisfactory because of the flexible character thereof. Preferably, the inner edge of the tubular body 10 is inclined as indicated by the numeral 24, so that there will be a gradual merging of the interior of the body 10 with the larger diameter conduit 11.

Operation

In the operation of the structure shown in Figs. 1 to 7, inclusive, the conduit 11 is secured within the wall 16, as illustrated, and it will be assumed that conductors have been drawn through the conduit. It is now desired to insert the bushing about the conductors and to support them in insulated relation in the end portion of the conduit 11. To accomplish this, the tubular body and the ring 12 are opened by spreading apart the free edges thereof so that the body may be thus slipped over and around the conductor wires. The free edges of the body are then brought together, as illustrated in Figs. 3, 6 and 7, and the free edges of the ring 12 are twisted so as to insert the tongue 22 within the end of the groove 23. The flexible character of the ring permits this twisting operation and the locking of the two ends by bringing one end of the tongue 22 into the opposite end of the groove 23. The flanges of the tongue are then drawn behind the walls of the groove 23 to bring the parts into the position shown in Fig. 6. The ring 12 is thus locked snugly about the conduit end 11, and this connection serves to hold also the tubular body 10 in the position illustrated in Fig. 7.

By the foregoing operation, the tubular bushing is brought into an enclosing relation with respect to conductors already present in a conduit, and the bushing is locked securely thereabout to maintain the insulation and protect the conductors at the end of the conduit.

In order to seal the ends of the ring at the point where they are locked by the tongue and groove, I prefer to provide an extension or rib 25, as shown more clearly in Fig. 1.

In Fig. 8, there is shown a modified form of the invention. In this structure, the ring 26 is provided with integral threads 27, and the metal ring 28 is secured only to the outer portion of the ring 26. In the illustration given, the ring 28 is provided with inwardly-turned flanges 29 embedded within the body of the ring 26. Integrally formed with the ring body 26 is an outwardly-extending sealing rib or flange 30. The tubular body 31 is provided with the same form of tongue 32 and groove 33 structure already described.

The metal ring 28 is provided on one side with a latch opening 34, and on the opposite side with a locking tongue 35.

In the operation of the structure shown in Fig. 8, the body 31 is opened to receive the conductors, and the parts are then brought together, with the tongue 35 being extended through the opening 34 of the ring 28. Under the leverage thus provided, the two ends of the ring 26 are brought together and locked by pressing the malleable tongue 35 downwardly against the top surface of the ring.

In both of the structures, the rings may be screwed upon the threads of the conduit, either before or after the ends of the ring flanges are brought tightly together. Ordinarily, I prefer to bring the ends of the ring flange into locking position before they are in threaded engagement with the threads of the conduit, and then the bushing is rotated to draw the annular flange or ring tightly against the wall 17.

With the foregoing structure and operation, I find that conductors can be quickly enclosed with the bushing, and the bushing can then be locked in closed position and threaded tightly against the wall to which the conduit is clamped.

While, in the foregoing specification, I have set forth the structure in considerable detail for the purpose of illustrating one embodiment of the invention, it will be understood that such details of structure may be widely varied by those skilled in the art without departing from the spirit of my invention.

I claim:

1. An insulating bushing for electrical conduits, and the like, comprising a flexible body having a tubular body portion adapted to be received within a conduit, said tubular body having an outwardly-extending integral flange and a rearwardly-extending integral ring threaded on its inner side to engage threads of said conduit, said ring and body being divided on one longitudinal side, and said ring being provided with interlocking connections for locking the divided edge portions of the ring together.

2. An insulating bushing for electrical conduits, and the like, comprising an insulating body having a flexible tubular body longitudinally divided and adapted to be received within a conduit, an outwardly-extending integral flange and a rearwardly-extending integral ring, a member fixed to said ring providing threads on the inner side thereof for engagement with threads of said conduit, and providing also at its divided edge portions interlocking connections for releasably locking the edge portions together.

3. An insulating bushing for electrical conduits, and the like, comprising an insulating body having a flexible tubular body longitudinally divided and adapted to be received within a conduit, an outwardly-extending integral flange and a rearwardly-extending integral ring, a member fixed to said ring providing threads on the inner side thereof for engagement with threads of said conduit, and providing also at its divided edge portions interlocking connections for releasably locking the edges together, said interlocking connections comprising a tongue at one of said edges and a groove at the other of said edges.

4. An insulating bushing for electrical conduits, and the like, comprising an insulating body having a tubular body adapted to be snugly received within a conduit, and having also an outwardly-extending integral flange and a rearwardly-extending integral ring spaced from said tubular body, said ring being equipped with threads for engaging threads of said conduit, said insulating body being divided along one side thereof, and said body along its free edges being equipped with a tongue and groove for sealing said body within said conduit.

5. An insulating bushing for electrical conduits, and the like, comprising an insulating body with a tubular flexible body divided along a longitudinal line and adapted to be snugly received within a conduit, said tubular body having an outwardly-extending integral flange and a rearwardly-extending integral divided ring, means for releasably locking the divided edge portions of the ring together, and a sealing rib carried by said insulating body and extending over the point of junction between the free edges of said tubular body and said divided edge portions of said ring when the same are brought together.

6. An insulating bushing for electrical conduits, and the like, comprising an insulating body having a resilient tubular body divided along a longitudinal line and adapted to be snugly received within a conduit and having also an outwardly-extending integral flange and a rearwardly-extending integral divided ring spaced from said tubular body, said tubular body having its divided edge portions provided with tongue and groove connections, and said ring having its divided edge portions provided with connections for releasably locking the said ends together.

7. In an insulating bushing for electrical conduits, and the like, comprising a resilient body having a tubular body portion divided along a longitudinal line and adapted to be received within a conduit, an outwardly-extending-integral flange and a rearwardly-extending integral divided ring spaced from said tubular body, and a divided metal ring having portions embedded within said resilient body and providing interlocking connections for locking the divided edge portions of said first-mentioned ring together.

8. An insulating bushing for electrical conduits, and the like, comprising a resilient body having a tubular body portion divided along a longitudinal line and adapted to be received within a conduit, an outwardly-extending integral flange and a rearwardly-extending integral divided ring spaced from said tubular body, and a divided metal ring having portions embedded within said resilient body and providing interlocking connections for locking the divided edge portions of said first-mentioned ring together.

9. The structure of claim 7, in which the interlocking connections on the metal ring comprise a tongue at one end of said ring and a groove at the other end of said ring.

10. The structure of claim 7, in which the interlocking connections comprise an opening at one divided edge portion of the metal ring and a malleable metal tongue at the other edge of said metal ring.

11. An insulating bushing adapted to be received about conductors placed within a conduit, comprising a flexible tubular body divided throughout its length and provided with an outwardly-extending flange and a rearwardly-extending ring, said divided tubular portion of said body being adapted to be received snugly within a conduit so as to hold the divided edge portions of the tubular body in adjacent sealing relation about said conductors.

FRANCIS A. BUZZELL.

REFERENCES CITED

The following references are of record in the file of this patent:

UNITED STATES PATENTS

| Number | Name | Date |
| --- | --- | --- |
| 566,507 | Erickson | Aug. 25, 1896 |
| 874,834 | Copping | Dec. 24, 1907 |
| 2,338,316 | Buzzell | Jan. 4, 1944 |
| 2,268,060 | Rhode | Dec. 30, 1941 |